Figure 1:
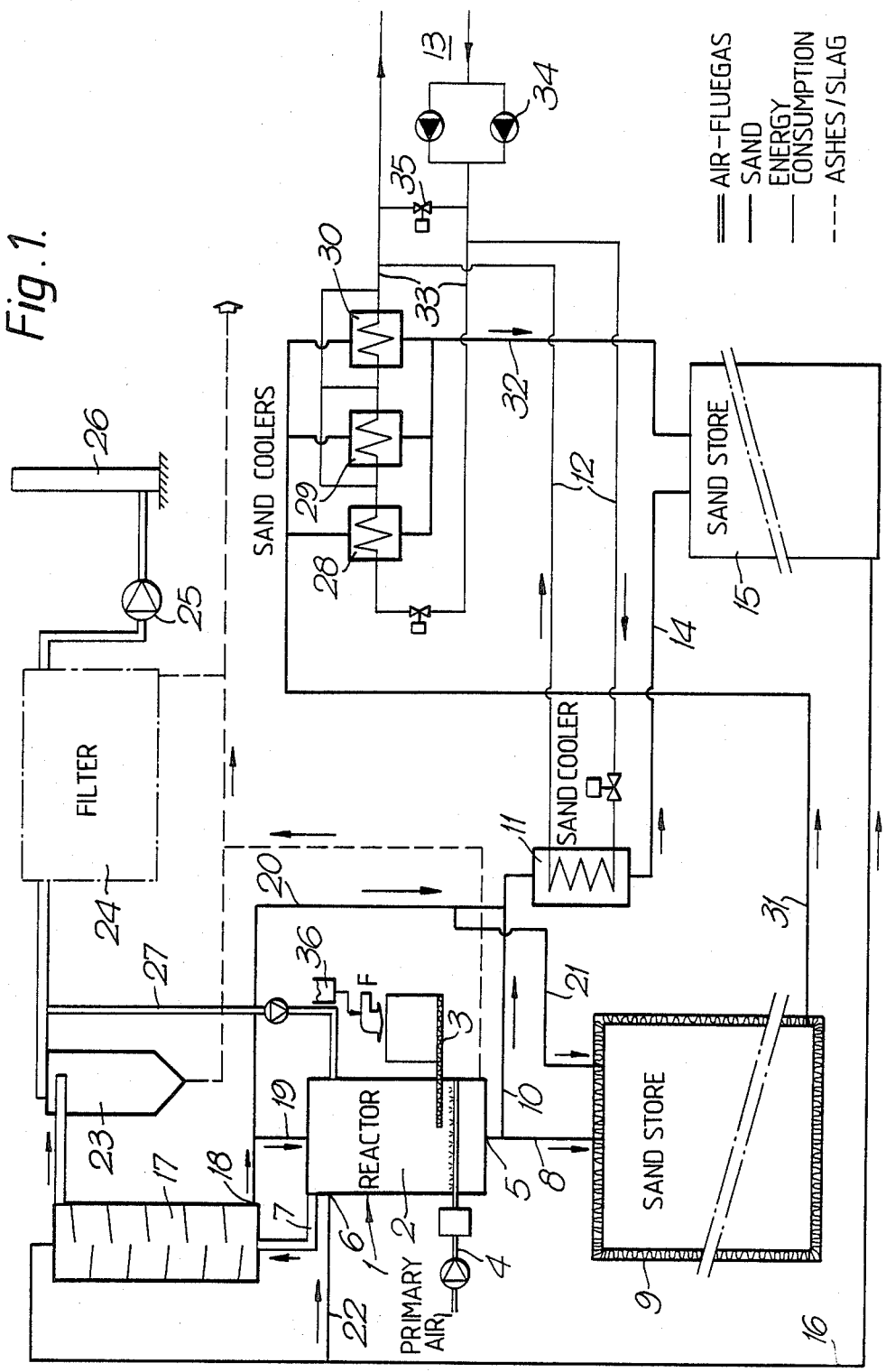

United States Patent [19]

Viken

[11] Patent Number: 4,794,882
[45] Date of Patent: Jan. 3, 1989

[54] METHOD OF OPERATING A COMBUSTION PLANT, AND A PLANT FOR CARRYING OUT THE METHOD

[75] Inventor: Nils I. Viken, Hamar, Norway

[73] Assignee: Santo A/S, Gjøvik, Norway

[21] Appl. No.: 141,690

[22] PCT Filed: Apr. 30, 1987

[86] PCT No.: PCT/NO87/00031
§ 371 Date: Feb. 16, 1988
§ 102(e) Date: Feb. 16, 1988

[87] PCT Pub. No.: WO87/06687
PCT Pub. Date: Nov. 5, 1987

[30] Foreign Application Priority Data
May 2, 1986 [NO] Norway ................................. 861762

[51] Int. Cl.⁴ .............................................. F23B 1/00
[52] U.S. Cl. .................... 122/4 D; 110/203; 165/104.16; 165/104.18; 165/39
[58] Field of Search ...................... 165/104.15, 104.16, 165/39, 104.18; 122/4 D, 367 PF, 7 R; 110/203

[56] References Cited
U.S. PATENT DOCUMENTS
4,111,158  9/1978  Reh et al. .......................... 122/4 D
4,158,385  6/1979  Vandenhoeck ....................... 165/39
4,704,084 11/1987  Lun et al. ....................... 122/4 D X Primary Examiner—Edward G. Favors
Attorney, Agent, or Firm—Dressler, Goldsmith, Shore, Sutker & Milnamow, Ltd.

[57] ABSTRACT

A method of operating a combustion plant including a reactor, e.g. a fluidized-bed reactor which transfers heat form a fuel to a granular medium, such as sand, and wherein a part of the heated medium during operation is discharged from the combustion chamber (2) of the reactor (1) and supplied to a heat-producing heat exchanger (11). The plant further includes a storing means (9) which is connected to the combustion chamber (2) of the reactor (1), and a part of the discharged hot medium is transferred to the storing means (9) which stores the medium in order to accumulate the heat therein. In case of increased energy demand, hot medium is supplied from the storing means (9) to one or more additional heat exchangers (28, 29, 30) for supplementing the heat production of the first-mentioned heat exchanger (11).

8 Claims, 2 Drawing Sheets

METHOD OF OPERATING A COMBUSTION PLANT, AND A PLANT FOR CARRYING OUT THE METHOD

The present invention relates to a method of operating a combustion plant including a reactor having a combustion chamber wherein heat is transferred from a fuel to a granular medium, and wherein a portion of the heated medium during operation is discharged from the combustion chamber of the reactor and supplied to a heat producing heat exchanger. Further, the invention relates to a combustion plant for operation in accordance with the method.

A method of the above-mentioned type is known from Norwegian patent specification No. 143 643. The patent specification discloses a method and an apparatus for operating a fluidized-bed incinerator, wherein the fluidized-bed incinerator has a combustion chamber containing a fluidized-bed medium which is heated during combustion of fuel in the combustion chamber. A portion of the hot fluidized-bed medium is discharged from the combustion chamber and supplied to a separate heat exchanger, and after cooling in the heat exchanger the medium is returned to the fluidized bed of the combustion chamber.

This method is advantageous in that the temperature of the fluidized bed can be maintained at a suitable value, and further the temperature in the zone above the fluidized bed and consequently the exhaust gas temperature can be reduced. However, a heat-producing combustion plant which should operate in accordance with this known technique, would be limited to the maximum heating effect which can be delivered by the heat exchanger. In case of a larger power demand one would be dependent on other facilities, such as oil boilers or electrical boilers, in order to deal with e.g. peaks in the power consumption.

It is an object of the invention to provide a method and a heat-producing combustion plant making it possible for the combustion plant to be built with a power capacity which is equal to the average value of the power consumption over a time period, at the same time as—when peaks in the power consumption occur—more power can be delivered with the utilization of accumulated heat energy.

Another object of the invention is to provide a method and a plant which can produce heat with a steady power over the entire year, and which can store the heat in a part of the heated medium during that part of the year when the power consumption is lower than the power production, and wherein the heat of the hot medium can be used as a supplementing power production in that part of the year when the steady power production is too small to cover the power demand.

The above-mentioned object is achieved with a method of the introductorily stated type which, according to the invention, is characterized in that a part of the discharged hot medium is transferred to a separately provided, insulated store for accumulating the heat in the medium, and the hot medium subsequently, and according to requirement, is supplied from the store to one or more additional heat exchangers for supplementing the heat production of the first-mentioned heat exchanger.

The combustion plant which is provided according to the invention, includes a reactor having a combustion chamber with a granular medium contained therein which is heated during the combustion, and a heat exchanger which is connected to the combustion chamber and is arranged for through-flow of hot medium which is discharged therefrom, and is characterized in that it includes an insulated storing means which is connected to the combustion chamber of the reactor and arranged to receive and store hot medium discharged from the combustion chamber, to accumulate the heat therein, and one or more additional heat exchangers which are connected to the storing means to be supplied with stored, hot medium therefrom, in order to supplement, when required, the heat production of the first-mentioned heat exchanger.

With the method and the plant according to the invention a number of substantial advantages are achieved. Some of these can be summarized as follows:
1. A small combustion plant, e.g. with an output of 30–35% of the maximum output.
2. Energy can be stored for later comsumption (long time storing).
3. A larger power tapping when necessary.
4. Independent of oil or other energy to handle peaks in the power consumption.
5. The combustion plant may be run at full power during the entire operational period.
6. The necessary power can be produced also when overhauling the combustion plant, power then being taken from the store.
7. The power tapping can be regulated from 0 to 700% of the capacity of the combustion plant.

Figure 2:
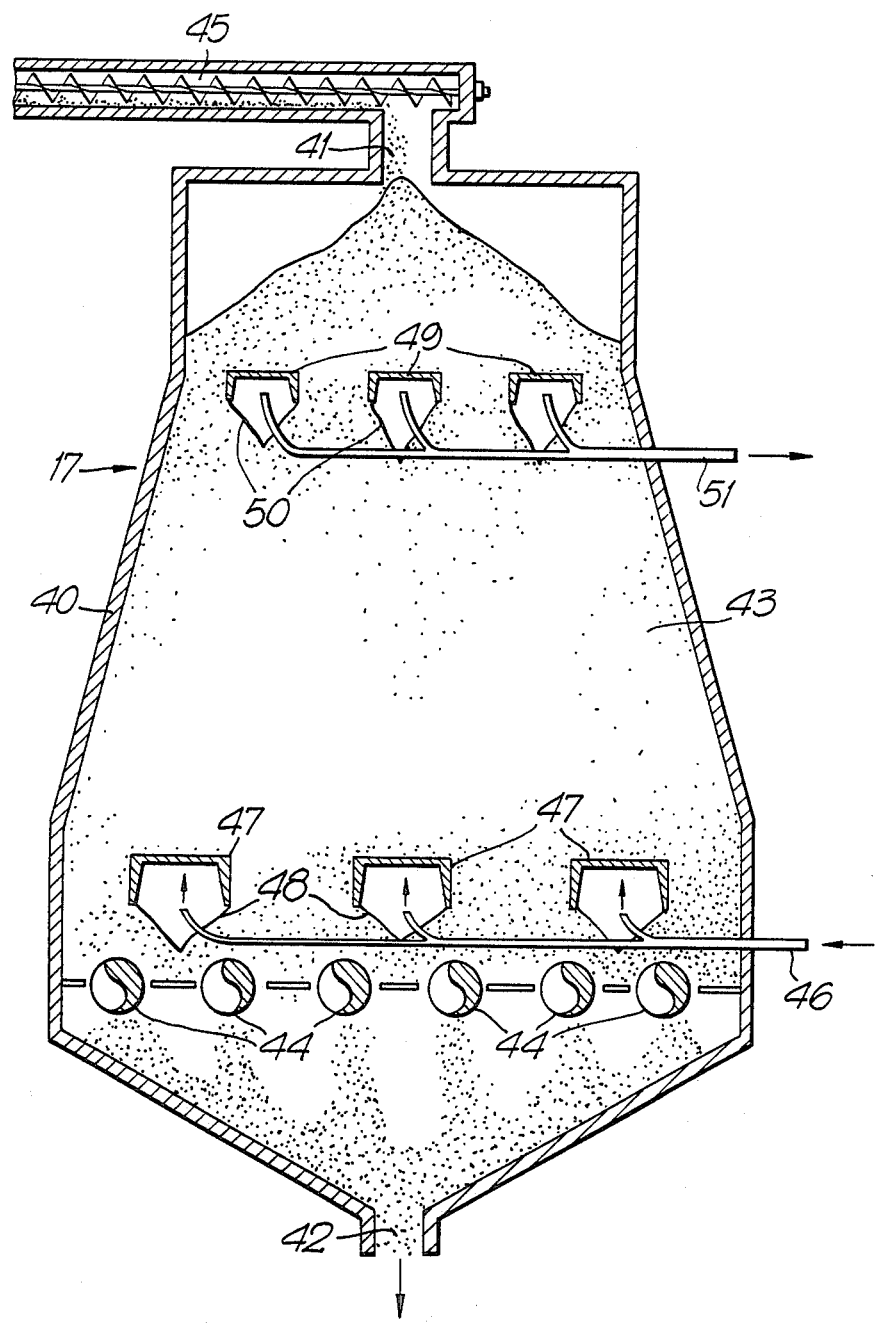

Other objects and advantages of the invention will appear from the following further description with reference to the drawings, wherein FIG. 1 shows a plant according to the invention in schematic representation; and FIG. 2 shows a longitudinal sectional view of a flue gas cooler forming part of the plant according to the invention.

The plant shown in FIG. 1 includes a combustion reactor 1 which may advantageously be of the type disclosed in the aforementioned Norwegian patent specification No. 143 643. This reactor is a fluidized-bed reactor which is constructed for through-flow of a fluidized-bed medium in the form of sand. In the following description it is therefore presupposed that the medium heated by combustion of fuel in the reactor is sand, even if it may be contemplated that also other granular of flowable mediums may be used for heating and storing or heat in a plant according to the invention.

The fuel used may be of arbitrary type, for example refuse or different types of other cheap fuel, having a calorific value above 1,7 MWh/ton. As shown, the fuel "F" is supplied to the combustion chamber 2 of the reactor by way of a feeding means 3. Primary air for the combustion is supplied by way of a suitable means 4.

At the bottom the reactor 1 is provided with an outlet 5 for hot sand which is discharged from the reactor with a temperature of 800°–1000° C. In its upper region the reactor has an inlet 6 for the supply of cold sand (temperature ca. 80° C.) for the control of the temperature in the fluidized bed, to thereby obtain a constant temperature of the combustion gases from the reactor. For example, there may be chosen a temperature of 750°–900° C. The combustion or exhaust gas is discharged via an outlet to an exhaust duct 7.

The reactor outlet 5 is connected by way of a first transport means 8 to a storing means 9 which is heat insulated and arranged for the storing of heated sand discharged from the reactor, and thus provides for heat accumulation. The sand store may be adapted to all heat accumulation requirements, from twenty-four hours accumulation to annual accumulation. The accumulation capacity of the sand at 900° C. is 300 kWh/m$^3$ sand.

The reactor outlet 5 is also by way of a second transport means 10 connected to a first heat exchanger or sand cooler 11. As suggested, this contains through-flow conduits for a heat medium flowing through a conduit 12 connected to a power-consuming network 13. The heat medium in the power consumption network 13 may be hot water, vapour, hot oil or air. The power consumer may also be an absorption heat pump, or another energy consumer.

The outlet of the sand cooler 11 is connected by way of a transport means 14 to a storing means 15 for cold sand. In this store the sand is stored after having been cooled in the sand cooler 11 to the temperature of the heat medium. The storing means 15 is connected by way of a transport means 16 to the upper region of a flue gas cooler 17 which, in its bottom region, is connected to the exhaust duct 7 from the reactor 1. The special construction and operation of the flue gas cooler will be further described below with reference to FIG. 2. At its bottom region, the flue gas cooler has an outlet 18 for a warm sand which has been heated during its passage downwards in the flue gas cooler in counter-current to the hot exhaust gas from the reactor. The outlet 18 is by way of a transport means 19 connected to the reactor 1 in its upper region, for the supply of warm sand thereto. Further, the outlet 18 is by way of a further transport means 20 connected to the sand cooler 11, and by way of a still further transport means 21, which is shown to be branched from the transport means 20, connected to the heat-accumulating storing means 9.

Between the store 15 for cold sand and the flue gas cooler 17, the transport means 16 is also connected to a transport means 22 for the supply of cold sand to the reactor 1 through the inlet 6. The quantities of sand to the reactor and to the flue gas cooler are controlled by the temperature of the sand from the reactor and from the gas cooler.

The exhaust gas from the flue gas cooler 17 goes to a coarse separator 23 and therefrom to a filter 24 for fine cleaning of the gas. The purified gas from the filter goes via a fan 25, which provides the necessary negative pressure, to a chimney 26.

As shown, cooled coarsely purified gas is also supplied by way of a conduit 27 to the reactor 1 to control the so-called freeboard temperature, i.e. the temperature in the zone above the sand layer in the combustion chamber 2.

In accordance with the invention, the plant further includes one or more additional heat exchangers which are connected to the storing means 9 to be supplied with stored hot medium therefrom, in order to supplement, when required, the heat production of the heat exchanger 11. The plant is shown to include three such heat exchangers or sand coolers 28, 29, 30 which are supplied with sand from the storing means 9 by way of a transport means 31. The outlet from each of these heat exchangers is connected by way of a transport means 32 to the storing means 15 for cold sand. In a manner corresponding to that described for the heat exchanger 11, also the through-flow conduits of these exchangers are connected to conduits 33 which are connected to the consumption network 13 and through which the heat medium in the consumption network flows. This heat medium is pumped through the network by a pumping means 34. Between the cold side and the hot side of the conduit network there is shown to be connected, in the usual manner, a shunt valve 35 for temperature compensation in the network.

The construction of the flue gas cooler will be further described below with reference to FIG. 2. The cooler consists of a container or vessel 40 having an upper inlet 41 for cold sand and a lower outlet 42 for warm sand. As shown, the vessel 40 has no conventional heating surfaces, but is filled with sand 43 up to the inlet 41. In the bottom region of the vessel there is provided a feeding-out means 44 for feeding out warm sand through a funnel-shaped bottom portion to the outlet 42. The feeding-out means, which may e.g. consist of a plurality of sluices in a bottom plate, is designed so as to be able to handle sand of the temperature in question. As the warm sand is fed out through the feeding-out means 44, the sand sinks by its own weight downwards through the vessel 40, and fresh sand is supplied through the inlet 41 by means of a transport means 45 which is in connection with the transport means 16 from the store 15 for cold sand.

Warm flue gas from the exhaust duct 7 of the reactor is introduced into the vessel 40 through a duct 46 to a gas inlet means which is shown in the form of a number of distribution channels 47 surrounded by the sand 43 and having downwards facing openings 48 towards the surrounding sand. The flue gas is sucked into the sand through the openings 48 and is distributed between the sand grains and sucked upwards to an outlet means in the upper region of the vessel. The outlet means is also shown to consist of a number of distribution channels 49 surrounded by the sand 43 and having downwards facing openings 50 towards the surrounding sand. The flue gas exits from the sand via the openings 50 and flows through an outlet duct 51 to the coarse separator 23.

The sand comes in at the top of the flue gas cooler with a temperature of up to 100° C. The gas from the reactor comes into direct contact with the sand grains and thereby gives off its heat energy to the sand, and thus the gas is cooled in an effective manner in counter-current to the sand. The gas enters the vessel with a temperature of 800°–1050° C., whereas at the top of the vessel it has largely the same temperature as the sand, i.e. ca. 100° C. At the bottom of the vessel, the sand is taken out with a temperature of up to 900° C. As mentioned, the transport of the sand in the vessel takes place by means of the gravity, or possibly with the assistance of mechanical transport means (not shown). The gas is forced upwards through the sand in the vessel by means of the pressure differential between the bottom and the top.

The operation of the plant according to the invention in all essentials will be clear from the preceding description of the construction of the plant. A summarizing description of the operation, and of additional advantageous aspects of the plant, will be given below.

When burning fuel in the reactor 1, a part of the energy is transferred to the sand in the reactor. The rest of the energy is bound in the gas phase leaving the reactor and entering the vessel 40 of the flue gas cooler. Cold sand is supplied to the reactor and the vessel from the sand store 15 via the transport means 16 and 22. The heated sand from the vessel is supplied to the reactor via the transport means 19, alternatively to the sand cooler 11 via the transport means 20, or alternatively to the heat accumulating sand store 9 via the transport means 21. From the reactor 1, the heated sand goes to the sand store 9 via the transport means 8, or alternatively to the sand cooler 11 via the transport means 10.

The sand cooler 11 is supplied with a sufficient quantity of sand from the vessel and the reactor to cover the normal heat demand in the consumption network 13, i.e. the energy or power consumption corresponding to the energy production of the combustion plant. In the sand cooler 11, the sand is cooled down to the temperature of the heat medium in the consumption network 13, and the cooled sand goes to the store 15 for cold sand.

With an energy consumption in the network 13 which is less than the output or power from the combustion plant, some sand goes to the heat exchanger 11 to cover the energy consumption. The excess part of the sand goes via the transport paths 8 or 21 to the heat accumulating store 9 for storage.

With an energy consumption which is larger than the output of the combustion plant, the sand goes from the flue gas cooler 17 and the reactor 1 via one of the transport paths 19, 20, 10 to the heat exchanger 11. Furhter, warm sand is tapped from the sand store 9 and supplied by the transport means 31 to the additional heat exchangers/sand coolers 28, 29, 30 for transfer of energy to the consumption network 13. The sand cooled in the sand coolers is supplied to the store 15 via the transport path 32. The sand quantity tapped from the store 9 is controlled by the energy consumption in the network 13.

As distinct from the previously known combustion plants, the energy-storing combustion plant according to the invention can be used to produce warm water, hot water, vapour, over-heated vapour, warm air, warm hot-oil, in short cover all energy demands at a temperature demand below 800° C., either by indirect or direct heating.

With the various types of cheap fuel which can be used in such a plant, in order to reduce the energy price, one must take into account that some of the fuel types will contain substances which are not wanted to be discharged into the atmosphere.

By admixing a suitable absorbent into the fuel before it is fed into the reactor 1, as suggested at 36 in FIG. 1, undesired components can be absorbed in the present plant. Parts of or the entire absorbent quantity follow the flue gases from the reactor to the vessel 40. In the vessel the absorbents are distributed between the sand grains and are thereby delayed in relation to the gas flow. Therefore, a subtantial increase of the dwell time of the absorbent is achieved in all temperature areas through the vessel.

As a result of the movement of the sand downwards in the vessel, the absorbent will finally go out into the cleaning system for settling before the gas goes to the chimney 26. Thus, by means of the described vessel structure, there is achieved an increased efficiency for the absorbents and a cleaner flue gas from the combustion plant with all types of fuel.

As appears from the above, the plant according to the invention results in a number of advantages in addition to the introductorily stated advantages 1-7. As such advantages there may be mentioned:

8. Making the flue gas cleaning more effective with absorbents.
9. Absorbing undesired components, such as HCL, $SO_x$, Hg, fluorine compounds (HF) and heavy metals.
10. Reduce the discharges of CO, dioxines and polyaromatic hydrocarbons (PAH).
11. Obtain an efficient flue gas cooling without intervening with a so-called "economizer" (heat exchanger after boiler) in the system.
12. Removing the entire conventional heat transfer system in the boiler plant and replace it by sand coolers.
13. Building a storing system storing high-quality energy which can be used for energy production up to 800° C., either directly of via heat exchangers.

I claim:

1. A method of operating a combustion plant including a reactor (1) having a combustion chamber (2) wherein heat is transferred from a fuel to a granular medium, and wherein the combustion gas from the reactor (1) is supplied to a flue gas cooler (17), CHARACTERIZED IN that a part of the discharged hot medium, as known per se, is transferred to a separately provided, heat-insulated store (9) for accumulating the heat in the medium, and that hot medium subsequently, and according to requirement, is supplied from the store (9) to at least one heat-producing heat exchanger (11 resp. 28, 29, 30), that a part of the cooled medium from the heat exchanger (11 resp. 28, 29, 30) is supplied to the flue gas cooler (17) to cool the flue gas in that the gas flows through the medium (43) and simultaneously causes heating thereof, and that heated medium from the flue gas cooler is supplied to the heat-accumulating store (9) or, when required, to the combustion reactor (1).

2. A method according to claim 1, characterized in that the cooled medium from said at least one heat exchanger (11 resp. 28, 29, 30) is supplied to a store (15) for cold medium, and that medium from this store is supplied to the reactor (1) to control the combustion temperature thereof.

3. A method according to claim 1 or 2, characterized in that a part of the hot medium from the flue gas cooler (17) when required is supplied to said at least one heat exchanger (11) as a supplement to hot medium from the combustion reactor (1).

4. A combustion plant including a reactor (1) having a combustion chamber (2) with a granular medium contained therein which is heated during the combustion, and a flue gas cooler (17) which is connected to the reactor (1) and wherein the combustion gases from the reactor (1) are cooled, characterized in that it includes a heat-insulated storing means (9) which is connected to the combustion chamber (2) of the reactor (1) and arranged to receive and store hot medium discharged from the combustion chamber (2) during the combustion, to accumulate the heat therein, and at least one heatproducing heat exchanger (11 resp. 28, 29, 30) which is connected to the storing means (9) to be supplied with stored, hot medium therefrom when required, and a means (14, 32, 15, 16) for the supply of cooled medium from said at least one heat exchanger (11 resp. 28, 29, 30) to the flue gas cooler (17), the cooler being arranged for through-flow of the flue gas from the reactor (1) through the supplied medium (43), for cooling of the flue gas during simultaneous heating of the medium (43), the flue gas cooler (17) being connected to the heat-accumulating storing means (9) and to the reactor (1) to allow supply of hot medium thereto.

5. A combustion plant according to claim 4, characterized in that it includes an additional storing means (15) which is connected to said at least one heat exchanger (11 resp. 28, 29, 30) to be supplied with cooled medium therefrom, and which is further connected to the combustion reactor (1) to allow supply of cold medium to the combustion chamber (2) for controlling the combustion temperature in the reactor.

6. A combustion plant according to claim 4 or 5, characterized in that the outlet (18) for hot medium from the flue gas cooler (17) is also connected to said at least one heat exchanger (11).

7. A combustion plant according to claims 4 or 5 characterized in that the flue gas cooler (17) comprises a vertically arranged container (40) having an inlet (41) for cold medium arranged at the top and an outlet (42) for heated medium (43) arranged at the bottom, so that the container (40) is filled and passed by medium (43) flowing therethrough under the influence of gravity, a flue gas supply means (47) being arranged in the bottom region of the container (40), and a gas outlet means (49) being arranged in the upper region of the container.

8. A combustion plant according to claim 7, characterized in that each of the gas inlet and gas outlet means comprises a number of distribution channels (47 resp. 49) surrounded by the medium (43) and having downwards facing openings (48 resp. 50) towards the surrounding medium (43).

* * * * *